United States Patent
Thielecke et al.

(10) Patent No.: US 7,120,199 B2
(45) Date of Patent: Oct. 10, 2006

(54) LINK ADAPTATION FOR MIMO TRANSMISSION SCHEMES

(75) Inventors: Jörn Thielecke, Erlangen (DE); Udo Wachsmann, Schwabach (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 826 days.

(21) Appl. No.: 10/137,701

(22) Filed: May 3, 2002

(65) Prior Publication Data

US 2003/0003863 A1    Jan. 2, 2003

(30) Foreign Application Priority Data

May 4, 2001    (EP)    .................... 01110838

(51) Int. Cl.
 *H04B 7/02*    (2006.01)
(52) U.S. Cl. .................................. 375/267
(58) Field of Classification Search .............. 375/220, 375/221, 260, 267, 299, 347
See application file for complete search history.

(56) References Cited

U.S. PATENT DOCUMENTS

| | | | |
|---|---|---|---|
| 6,473,467 B1 * | 10/2002 | Wallace et al. | 375/267 |
| 2002/0006168 A1 * | 1/2002 | Lee et al. | 375/267 |
| 2002/0191703 A1 * | 12/2002 | Ling et al. | 375/267 |
| 2003/0112880 A1 * | 6/2003 | Walton et al. | 375/260 |
| 2005/0195915 A1 * | 9/2005 | Raleigh et al. | 375/267 |

OTHER PUBLICATIONS

Kousa M.A. et al, "Adaptive Binary Coding for Diversity Communication Systems," IEEE International Conference on Personal Wireless Communications Proceedings, XX, XX, 1997, pp. 80-84.

Ada S. Y. Poon, et al, "An Adaptive Multi-Antenna Transceiver for Slowly Flat Fading Channels," Berkeley Wireless Research Center, Dept of Electrical Engineering and Computer Science, University of California, Berkeley, 'Online! Mar. 2000, pp. 1-35, XP002179018.

Gerard J. Foschini, "Layered Space-Time Architecture for Wireless Communication in a Fading Environment When Using Multi-Element Antennas," Bell Labs Technical Journal, Bell Laboratories, US, vol. 1, No. 2, Sep. 21, 1996, pp. 41-59, XP000656005.

David N. Tse, "Optical Power Allocation over Parallel Gaussian Broadcast Channels," Proceedings of the 1997 IEEE International Symposium on Information Theory. Dept. of EECS, U.C. Berkeley, ISIT '97, Jun. 29, 1997, p. 27 XP000950618.

(Continued)

*Primary Examiner*—Don N. Vo
(74) *Attorney, Agent, or Firm*—Nixon & Vanderhye P.C.

(57) ABSTRACT

MIMO transmission methods are applied to communicaiton systems in which a transmitter has more than one transmit antenna and a receiver has more than one receive antenna. Information to be transmitted is divided into a plurality of subsignals according to the number of used transmit antennas and each subsignal is processed separately before it is emitted by the respective transmit antenna. In the receiver the different receive signals are processed thus that subsignals are detected and decoded and the contribution of each detected and decoded subsignal is subtracted from the receive signals and whereby a feedback channel from receiver to transmitter is used to send control information to the transmitter depending on the receive situation. In order to optimize the usage of the MIMO channel the invention proposes the in the receiver the link quality of each subsignal is determined and information of each subsignal is transmitted to the receiver via the feedback channel and that in the transmitter properties of the subsignals are controlled by the link quality information.

19 Claims, 3 Drawing Sheets

OTHER PUBLICATIONS

Figure 1:
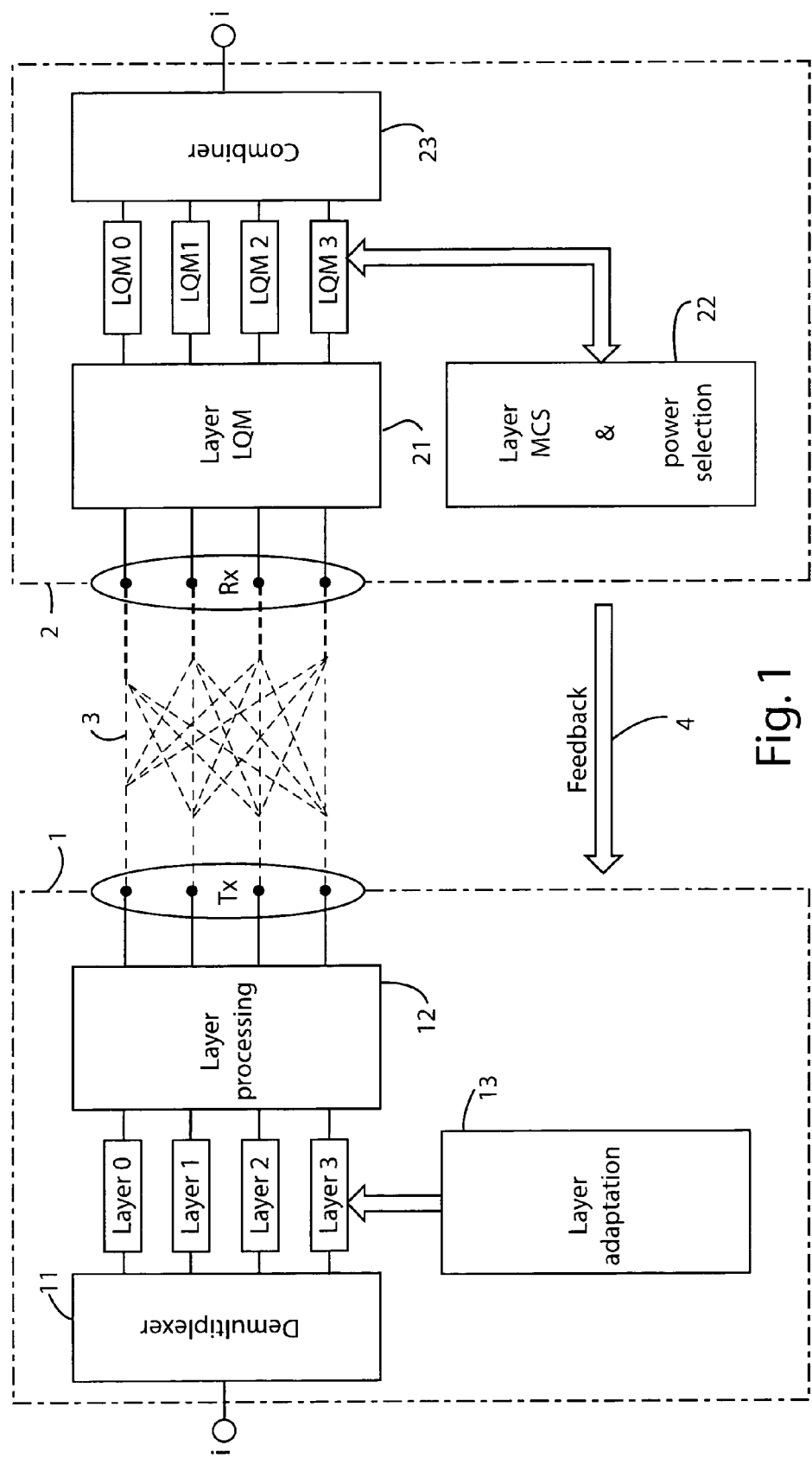

G.D. Golden, et al, "Detection Algorithm and Initial Laboratory Results using V-Blast Space-Time Communication Architecture," Electronics Letter, IEE Stevenage, GB, vol. 35, No. 1, Jan. 7, 1999, pp. 14-16 XP006011643.

Udo Wachsmann, Jörn Thielecke, and Hans Schotten; "Exploiting the Data-Rate Potential of MIMO Channels: Multi-Stratum Space-Time Coding."

Ada S. Y. Poon, David N. C. Tse, and Robert W. Brodersen; "An Adaptive Multi-Antenna Transreceiver for Slowly Flat Fading Channels;" Berkeley Wireless Research Center, Department of Electrical Engineering and Computer Science, University of California; pp. 1-35.

M. A. Kousa and S. A. Al-Semari; "Adaptive Binary Coding for Diversity Communication System;" Electrical Engineering Department; KFUPM, Dhahran 31261, Saudi Arabia; 1997 IEEE; ICPWC'97; pp. 80-84.

Vahid Tarokh, Ayman Naguib, Nambi Seshadri, and A. Robert Calderbank; "Combined Array Processing and Space-Time Coding;" IEEE Transactions on Information Theory, vol. 45, No. 4, May 1999; pp. 1121-1128.

Lucent Technologies Inc.; "MIMO System Integration and Signalling in HSDPA;" Agenda Item: 7.3.1 HSDPA; Document for Discussion and Decision; TSG-RAN Working Group 2 #19; Sophia-Antipolis, France; Feb. 19-23; R2-010503.

\* cited by examiner

LINK ADAPTATION FOR MIMO TRANSMISSION SCHEMES

FIELD OF THE INVENTION

The present invention relates to a wireless communication system for transmitting information between a transmitter having more than one transmit antenna and a receiver having more than one receive antenna, whereby information to be transmitted is divided into a plurality of subsignals. Each subsignal in such a system is processed separately before it is emitted by the transmit antenna. In the receiver adapted for such a system the receive signal is processed thus that subsignals are detected and decoded. The contribution of each detected and decoded subsignal is subtracted from the receive signal. A feedback channel from receiver to transmitter is used to send control information to the transmitter depending on the receive situation

DESCRIPTION OF THE PRIOR ART

One method to efficiently utilise the available transmission potential of wireless communication channels is to use link adaptation (LA). Thereby, the transmitter has knowledge of one or more channel parameters reflecting the current ability of the channel for transmit data reliably. This kind of information is referred to as channel state information (CSI). Examples are signal-to-noise ratio or frame error rate.

There are already a couple of systems where link adaptation is included in the specification of the systems. The following subsections shall provide an overview of state-of-the art link adaptation schemes and its major features.

The classical form of link adaptation is to select a modulation and coding scheme for single-antenna links. However, if Multiple-input multiple-output (MIMO) transmission is considered, there are a lot more parameters of importance influencing the transmission properties than in the conventional case.

A channel having a single-antenna link between transmitter and receiver available is named as single-input single-output (SISO) channel. Link adaptation on SISO channels is the classical form of link adaptation as it is foreseen in most of the current systems. The core is that the transmitter has to select a modulation and coding scheme (MCS) out of a predefined set depending on the channel quality in order to meet the requirements of the considered service as good as possible. Examples for systems where such a link adaptation concept is foressen are: EDGE, HIPERLAN/2, and HSDPA.

Typically, the receiver measures the quality of the radio link. There are several possibilities to obtain such link quality measurements (LQM) like uncoded error rate or signal-to-noise-and-interference ratio. Based upon the LQM the receiver sends a recommendation to the transmitter, which MCS seems to be appropriate in the next transmission period.

High-speed downlink packet access is the high-speed evolution of UMTS, which is currently being standardized. Multiple-input multiple-output transmission is a transmission technique where multiple transmit and receive antennas are available. The proposal for MIMO transmission in HSDPA is related to V-BLAST. Thereby, the data stream is partitioned into independent layer data streams or code words. Every layer code word is transmitted from one transmit antenna.

The so-called V-BLAST transmission technique is known from EP 0 951 091 A2. Such a known communication system comprises a transmitter with k transmit antennas. The transmitter is responsive to receipt a m-dimensional transmit symbol vector from a source. The transmit vector is transmitted over m of the k transmit antennas using a predetermined modulation technique where $k \geq m \geq 1$. A receiver having n antennas for receiving signals from that receiver as n-dimensional received signal vectors, where $n \geq m$ comprises a detection processor that processes the n-dimensional received signal vector to form an estimate of the m-dimensional transmit symbol vector. Then the processor determines the best reordering of the transmitted components and then processes the received vector to determine the reordered transmitted symbol components. Such processing starts with the lowest level of the reordered components, and for each such level, cancels the interfering contributions from lower levels, if any, and nulls out interfering contributions from higher level, if any. This system also provides a feedback channel from receiver to transmitter for optimizing the selection of transmit antennas.

Most MIMO transmission techniques work similar to V-BLAST in the sense that the data stream is partitioned into multiple independent portions, which are processed, e.g. encoded, separately. The possibility to extract the transmitted information back at the receiver out of the layer signals strongly depends on the current propagation conditions on the MIMO channel. Therefore, the task of link adaptation for MIMO transmission is at least two-fold: a) determine the number of layers that can be separated again at the receiver and b) determine the appropriate MCS per layer.

In HSDPA there were proposals that the following information is signaled back on the uplink serving as criteria for selection of the downlink transmission settings:

Number of receive antennas

Recommendation: which transmit antennas shall be used

Recommendation: one MCS for all layers

The current MIMO proposal for HSDPA (TSG-RAN Document R2-010503) assumes at most four antennas at either the transmit or receive site. Accordingly, the following transmit modes are defined:

1. 4×4 MIMO (i.e. 4-layer MIMO with 4 transmit and 4 receive antennas)
2. 2×4 MIMO (i.e. 2-layer MIMO with 2 transmit and 4 receive antennas)
3. Space-time transmit diversity STTD (i.e. non-layered transmission with 2 transmit antennas to exploit transmit diversity)
4. Single antenna (non-layered conventional transmission from 1 antenna based on selection diversity)

on the correlations in the current MIMO channel matrix.

A MIMO transmission technique proposed by the applicant is multi-stratum space-time coding (MSSTC). Thereby, the data stream is partitioned into multiple independent portions, here called strata. In the patent application EP 00121621.7, there is already mentioned that the power and the rates of the strata can be adapted individually per stratum. However, it is not further specified where to base this adaptation upon.

Discrete matrix multitone (DMMT) and variants thereof is proposed in Gregory G. Raleigh; John M. Coffi, "Spatio-Temporal Coding for Wireless Communication", IEEE Transaction on communications, Vol. 46, No. 3, March 1998, pages 357–366 and Ada S. Y. Poon; David N.C. Tse; Robert W. Brodersen, "An adaptive Multi-Antenna Transceiver for Slowly Flat Fading Channels", available at http://degas.eecs.berkeley.edu/~dtse/pub.html as a means to optimally exploit the transmission potential of a MIMO channel.

The transmission is based on OFDM, whereby every OFDM subchannel is subject to MIMO propagation conditions. The core regarding link adaptation is that it is assumed that the transmitter has full knowledge of the channel, i.e. full or maximum channel state information of every OFDM subchannel is available at the transmitter. With this knowledge it is possible to pre-distort the transmitted signal such that a diagonal channel without interfering signal is generated. Additionally, with the waterfilling technique the transmitted power is distributed among the diagonal MIMO channels to achieve the maximum throughput.

While DMMT assumes full channel state information at the transmitter, the techniques to be discussed here, assume that only partial channel state information is available. The ideas for MIMO transmission presented in Syed Ali Jafar; Siram Vishwanath; Andrea Goldsmith, "Channel Capacity and Beamforming for Multiple Transmit and Receive Antennas with Covariance Feedback" available at http://wsl.stanford.edu/Publications.html, and Christopher Brunner; Joachim S. Hammerschmidt, Alexander Seeger; Josef A. Nossek, Spacer-Time Eigenrake and Downlink Eigenbeam former: Exploiting Long-term and Short-Term Channel Properties in WCDMA, available at http://www.nws.e-technik.tu-muenchen.de/cgi-bin/nws/publications, named covariance feedback and Eigenbeam forming, are based on the long- or mid-term correlation matrix of the channel. That means that the receiver estimates the channel matrices over a certain time period and calculates the correlations among the entries in the channel matrix. Instead of signaling the instantaneous channel matrices which means a rather high feedback signaling rate only updated versions of the correlation matrix are sent back to the transmitter. Since the correlation matrix mainly depends on the current scatterer scenario, which is usually assumed to change rather slowly over time compared to fast fading effects, the correlation changes also only rather slowly with time. Therefore, firstly, the rate to update the correlation matrix may be rather small, and, secondly, the estimation of the correlation matrix may be averaged over a rather long time period and thus a rather good estimate may be obtained.

Having the correlation (or covariance) matrix available at the transmitter, the eigenvectors of the correlation matrix are taken to steer the transmitted signals towards the eigenvalues of the correlation matrix. Additionally, water filling with respect to the eigenvalues is applied. This can e.g. imply that some eigenvalues are discarded for transmission since their amplitude is too small and it is therefore more valuable to put the power in the stronger eigenvalues.

PROBLEM OF EXISTING TECHNOLOGY

The crucial property of layered MIMO transmission compared to conventional SISO (single-input single-output) transmission, is that in addition to the perturbation of the receive signal by noise and interference from other users, the layer signals are perturbed by other layer's signals. This kind of interference has often by far the greatest impact on the transmission potential on the considered layer.

Since MIMO transmission is a quite recent transmission technique, there are up to now very few detailed proposals how to assess the described kind of inter-layer interference and how to use it for link adaptation.

OBJECT OF THE INVENTION

Therefore it is an object of the invention to find link quality measurements that suit best for MIMO transmission.

The initial idea to introduce layered MIMO transmission was to facilitate the task at the receiver by extracting the transmitted information stage by stage in a serial decoding process rather in one big decoding step. Thereby, one layer is detected and decoded and afterwards its contribution is subtracted from the receive signal. This kind of detection and decoding is called serial interference cancellation.

The information that can be reliably transmitted by one layer depends firstly, on the current channel conditions, and secondly, on the decoding order in the serial interference cancellation process. Therefore, it should be obvious that the transmission capabilities of the different layers and hence the appropriate layer MCS may be quite different for different layers. That means if the parameters assigned to all layers are identical the transmission potential of the MIMO channel might not be fully exploited in most of the cases. Therefore it is a further object of the invention to present a solution for best exploitation of a MIMO channel.

While for V-BLAST in HSDPA, switching off of antennas is considered as one ingredient in the link adaptation concept, for other transmission techniques like MSSTC, there are not yet such proposals available. In MSSTC, there is a full usage of all transmit antennas regardless of the number of strata being currently used. All schemes that are characterised by this property shall be named stratified MIMO schemes in the following in order to distinguish to layered MIMO schemes.

Depending on the channel conditions, it could be that the potential rate of one or more strata is very small. Then, it is usually advantageous to reduce the number of strata, i.e. the number of independent strata. Therefore it is another object of the invention to present a solution that adapts appropriately the transmitted signal in case of switching off strata while all transmit antennas are still in use.

SUMMARY OF THE INVENTION

To optimize the exploitation of the MIMO channel the link quality of each subsignal is determined in the receiver, information of each subsignal is transmitted to the transmitter via the feedback channel and that in the transmitter properties of the subsignals are controlled by the feedback information. As MIMO transmission offers a substantial performance gain when the channel is fed appropriately the way of link adaptation proposed here tries to exploit a big portion of this potential also in practice.

One option is to evaluate the determined link quality of each subsignal in the receiver and to generate control information that is send to the transmitter. Another option is to send the determined link qualities to the transmitter and to perform the evaluation of the determined link qualities in the transmitter.

The properties of the subsignals that are controlled directly or indirectly by the link quality information comprise the data rate of each subsignal, the transmit power of each subsignal, the modulation scheme of each subsignal are any combination of these properties.

The link quality determination may be based on an error rate measurement, a noise ratio measurement, or a capacity measurement. The capacity measurement may be fast-adaptive, e.g. when it is based on the instantaneous calculated capacities of each subsignal. Fast means that the measurement period is shorter or substantially equal to the time period in which fast fading becomes relevant. As fast fading is dependant from the Doppler shift of the signal the time period is also dependent from the velocity a receiver moves relatively from or to the transmitter.

For slow-adaptive embodiments a capacity calculation based on an average of the calculated capacities of each layer with respect to a longer time period or a capacity calculation that takes the outage of the calculated capacities of each layer with respect to a longer time period may be applied.

In a preferred embodiment the subsignals are mutually superimposed and diversity is added to each subsignal. For applying diversity to the subsignals a Space-Time code is proposed. This technique has been called by the inventors Multi Strata and is known from EP 1 195 937.

In a preferred embodiment the method comprises the steps of determining the link quality of each subsignal, compare the set of determined link qualities with a plurality of sets of pre-calculated link qualities in order to choose one of the pre-calculated sets as the best matching set of all pre-calculated sets and use the properties of the chosen pre-calculated set on which the chosen pre-calculated set was based as properties for the subsignals. This achieves a classification of the current measured link quality properties. As the continuum of possible link quality situations is mapped to a few classified situations the evaluation of the link quality situation is very efficient.

BRIEF DESCRIPTION OF THE INVENTION

An embodiment of the present invention is described below, by way of example only, with reference to the accompanying drawings, in which:

FIG. 1: shows a layered MIMO communication system with a feedback channel according to the invention.

Figure 2:
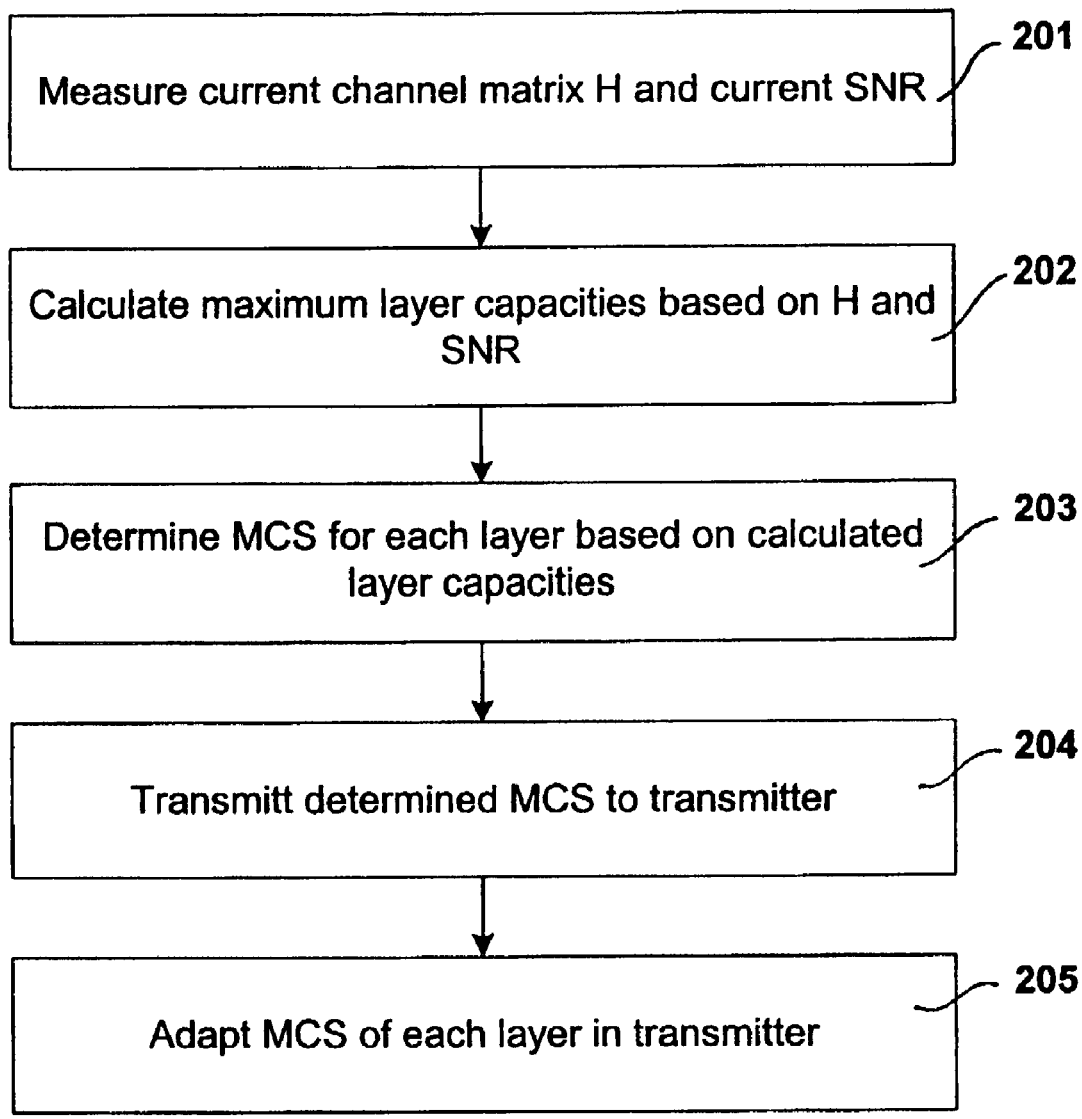

FIG. 2 Flow chart of steps for link quality control

Figure 3:
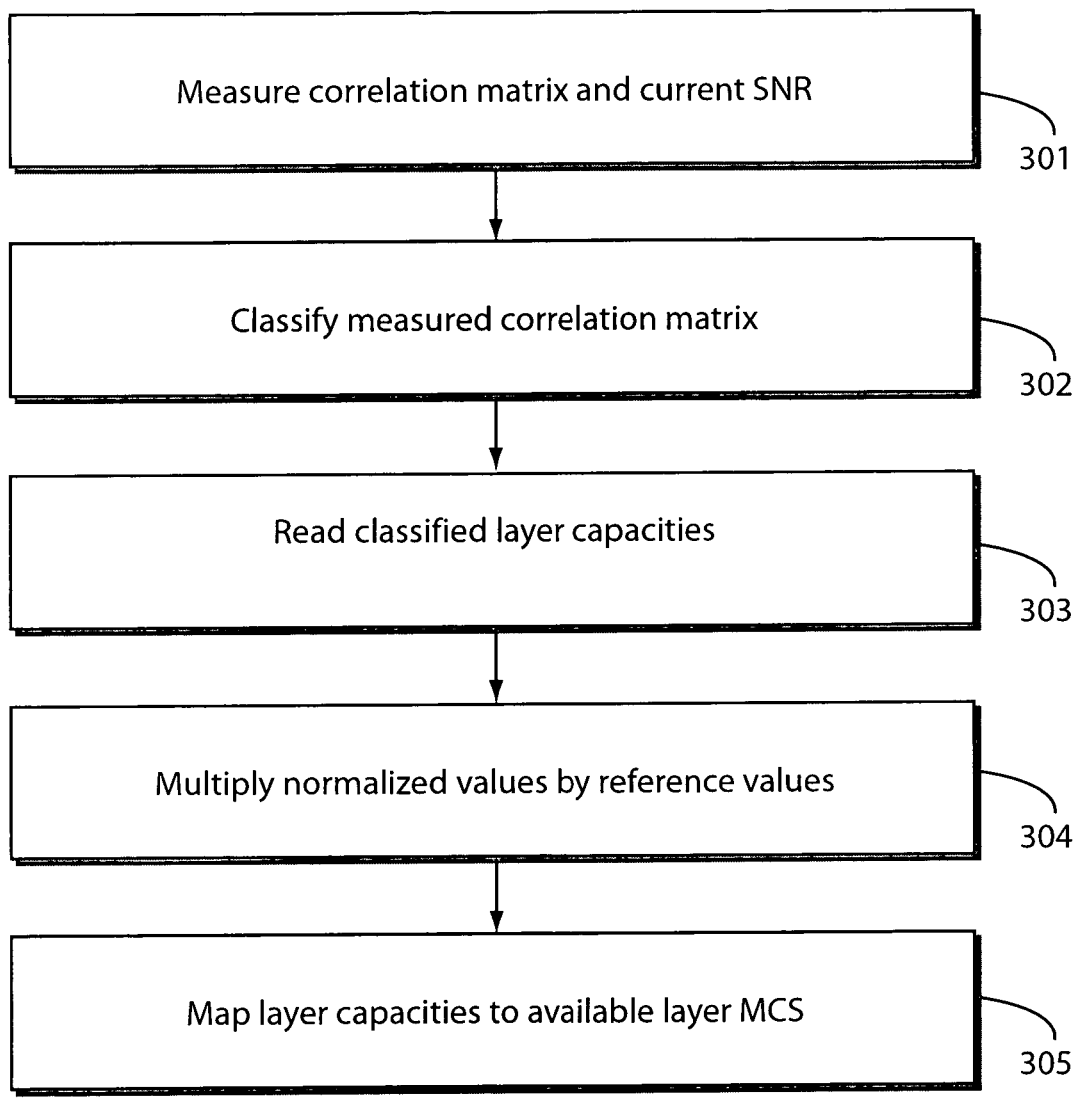

FIG. 3 Flow chart for classified link quality control

EMBODIMENT OF THE INVENTION

FIG. 1 shows a MIMO communication system with a transmitter 1 and a receiver 2. In this embodiment the transmitter 1 provides four transmit antennas and the receiver 2 also provides four receive antennas. Payload information i is split in the transmitter by a demultiplexer 11 into four subsignals which are also called Layer 0, Layer 1 Layer 2 and Layer 3. The demultiplexer can be controlled in a way that the data rate of each subsignal may be chosen different from the data rates of the other subsignals. The subsignals are processed by a layer processing unit 12 to achieve the desired MIMO properties. The subsignals are transmitted to the receiver 2 whereby they are subjected to a MIMO channel. In the receiver 2 the different layers are decoded and the link quality of each received subsignal (each layer) is determined by a layer link quality means 21. In this embodiment the link quality information is evaluated in the receiver in an evaluation unit 22 and control information is generated that is send to the transmitter 1 via a feedback channel 4. A layer adaptation means chooses from the feedback information the modulation and coding scheme (MCS) for each layer and also controls the demultiplexer 11 accordingly to provide the respective data rate for each layer. The skilled person in the art will readily appreciate that the link quality information may be send as such to the transmitter 1 and could be evaluated as well in the transmitter 1. However, the control information, which for example optimizes individually for each subsignal to be transmitted e.g. the code rate, modulation scheme and/or the transmit power thus allows to adapt each layer to the current MIMO channel.

In a first embodiment of the invention the capacity $C^{(0)}$, $C^{(1)}$, $C^{(2)}$ and $C^{(3)}$ of four layers $L_0$, $L_1 L_2$, $L_3$ is controlled by the feed back information. To elaborate the means to assess the transmission potential per layer (in general per partition) in the receiver the following notation shall be introduced. The transmission on layer m (partition m) shall be characterized by two parameters: code rate $R^{(m)}$ and power $P^{(m)}$. This applies to all possible layers m, m=0, . . ., M−1, where M is the total number of layers. For example, M may be equal to the number of transmit antennas $N_T$.

One measure of the link quality per layer m is the (Shannon) capacity of this layer $C^{(m)}$. In order to calculate the layer capacity, in a first step (201) the current channel matrix H as well as the current signal-to-noise ratio at the receiver input SNR are measured. It should be noted here that the term noise is understood in a quite general sense. Every disturbance either from co-channel interference or from thermal noise or from anything else shall be comprised in the noise power. For the calculation of the capacity continuously distributed Gaussian symbols are assumed at the channel input. Although this does not reflect the discrete-valued transmission alphabets like QAM that are used in reality, results obtained by the Gaussian assumption reflect very well the real transmission conditions. In a next step (202) the maximum layer capacities are calculated on base of the measured current channel matrix H and the current signal-to-noise ratio SNR. How the layer capacities can be calculated is described in detail in "Exploiting the Data-Rate Potential of MIMO Channels: Multi Stratum Space-Time Coding"; Udo Wachsmann, Jörn Thiellecke, Hans Schotten, VTC 2001 for the MIMO transmission schemes V-BLAST, D-BLAST, and MSSTC and therefore needs not to be discussed here. The method can be easily generalised to other MIMO techniques like multi-layer space-time coding (MLSTC)—which is known from "Combined Array Processing and Space-Time Coding"; Vahid Tarokh et al, IEEE Transaction on Information Theory, Vol. 45, pp 1121—as well.

In a next step (203) the results of the capacities are directly taken to give a recommendation for the modulation and coding scheme selection per layer. As there are at least two strategies this step is explained in more detail later on in the paragraph "Rate and Power Assignment Strategies for Layered MIMO" In a next step (204) the proposed modulation and coding scheme for each layer is transmitted via the feedback channel 4 to the transmitter 1. The information is extracted from the feedback channel and input to the layer adaptation device 13.

The capacity expressions derived in the aforementioned paper "Exploiting the Data-Rate Potential of MIMO Channels: Multi Stratum Space-Time Coding"; have a very simple structure. They look like:

$$C = \log_2(det(I + SNR * [H \ G \ G^H H^H]),$$

where H is the channel matrix and the matrix G comprises the operations to generate the transmitted signal. $(.)^H$ denotes the Hermitian operator for matrices. Therefore, the measured channel matrix and SNR can be directly inserted in the expressions. In the following an example for calculating the capacities of the subsignals $a^{(0)}$ . . . $a^{(3)}$ is given. The calculation is based on Space-Time encoded subsignals $a^{(0)}$ . . . $a^{(3)}$, four transmit antennas, four layers and four receive antennas.

The transmit signals are described by a vector s whereby matrices $G^{(0)} \ldots G^{(3)}$, the so-called generator matrices describe the modulation of the different subsignals $a^{(0)} \ldots a^{(3)}$:

$$s = [\underline{G}^{(0)} \; \underline{G}^{(1)} \; \underline{G}^{(2)} \; \underline{G}^{(3)}] \cdot \begin{bmatrix} \underline{a}^{(0)} \\ \underline{a}^{(1)} \\ \underline{a}^{(2)} \\ \underline{a}^{(3)} \end{bmatrix}$$

The receive signal r for a channel matrix H in AWGN can be described as:

$$r = H_B \cdot s + n$$

whereby the vector n describes the noise signals and $H_B$ is a block diagonal matrix where the actual channel matrix H appears $N_s$ times (with $N_s$ is the number of symbol periods per Space-Time Codeword) on the main diagonal:

$$H_B = \begin{bmatrix} H & & 0 \\ & \ddots & \\ 0 & & H \end{bmatrix}$$

This accounts for the general case of a Space-Time modulation spanning over $N_s$ symbol periods, e.g. if Alamouti coding is used $N_s=2$ holds.

The capacity $C^{(0)}$ of the first layer thus can be obtained by the following calculation:

$$C^{(0)} = \log_2(\det(I + SNR \cdot \underline{H}_B \cdot [G^{(0)} \ldots G^{(3)}] \cdot [G^{(0)} \ldots G^{(3)}]^H \underline{H}_B^H)) -$$
$$\log_2(\det(I + SNR \cdot \underline{H}_B \cdot [G^{(1)} \ldots G^{(3)}] \cdot [G^{(1)} \ldots G^{(3)}]^H \underline{H}_B^H))$$

The capacity of the other layers can be obtained in the same manner.

For an example with real figures for reasons of conciseness a very simple channel matrix H with integer values is assumed to have been obtained by measurement:

$$H = \begin{bmatrix} 1 & 2 & 3 & 4 \\ -2 & -3 & -4 & -1 \\ 3 & 4 & 1 & 2 \\ -4 & -1 & -2 & -3 \end{bmatrix}$$

In case an orthogonal space-time block code is used, R_STC=¾, SNR=2 dB and DFT is used to build the layers the capacities for four layers are calculated as:

$C^{(0)}=1.50$ [bit/symbol]

$C^{(1)}=1.94$ [bit/symbol]

$C^{(2)}=2.48$ [bit/symbol]

$C^{(3)}=3.06$ [bit/symbol]

Due to the assumed serial interference cancellation at the receiver, at least, for MSSTC, it is always the case that the capacities are increasing from lower to higher layers given that the lower layers are decoded first.

It is crucial to mention that it has to be taken into account that the capacity assumes ideal channel coding that cannot be accomplished in practice. In order to incorporate real coding schemes a certain gap in terms of SNR to capacity has to be used. The gap of real coding depends on at least the used coding scheme itself, and the target error rate. For example in case convolutional codes with 64 states and different rates are chosen as modulation and coding scheme (MCS) and a targeted bit error rate (BER) of $10^{-5}$ is chosen a gap of 4 dB can be assumed to be appropriate. That means if the measured channel SNR is at x dB, the capacity values have to be taken at x−4 dB in order to reflect the loss due to convolutional coding.

A further benefit of the described capacity calculation is that it automatically works best for linear MMSE detection. For different detection scheme, the MMSE capacity values serve still as a useful estimate. There is no need to set up the MSSE matrices or in general the equations for the linear detection algorithm explicitly.

In the following different measurement methods for the link quality are presented:

SINR Per Layer

Layers are transmitted according to the used MIMO scheme, e.g. MSSTC. At the receiver input, all layers are superimposed in general due to the propagation conditions of the MIMO channel. Usually, with linear interference suppression schemes prior to channel decoding the layer signals are separated to a certain extent. The task of detection in this context can be always described as finding a trade-off between suppressing the interference from other layers, enhancing the noise, and saving complexity in the detection scheme. Given the used detection scheme and again the measured current channel matrix H as well as the measured SNR, it is possible to derive expressions for the useful signal power, the power of interference from other layers, and the noise power after detection at the input of the channel decoder. Putting these terms together give the signal-to-noise-and-interference ratio SINR, whereby interference here only means the interference from other MIMO layers rather than the interference from other users.

The calculated SINR values per layer may now be used in the way as the SNR values are typically used in link adaptation for SISO channels.

By calculating the SINR per layer the parameter that is mainly characterizing the transmission on the considered layer is obtained. SINR is a measure that is commonly used also for SISO channels although there interference typically means multi-user interference.

Singular Values of the Channel Matrix

In order to get more insight into the properties of the channel matrix and into the inter-layer interference situation for MIMO transmission, a singular value decomposition of the channel matrix is very helpful:

$$H = U * S * V^H$$

where the columns of U are the left-hand singular vectors, the columns of V are the right-hand singular vectors and S is a diagonal matrix containing the singular values itself.

The singular values itself give already a very helpful indication on the inter-layer interference situation for transmission.

Examples:

MSSTC: the layer capacities are more or less uniquely determined by the singular values. Therefore, it is sufficient to know the singular values in order to appropriately assign rates to the individual layers.

BLAST type of schemes: layer capacities are determined by S and V. That means in practice that the rough interference situation is given already by the singular values and, so-to say, the variance of it is then generated by the current singular vectors in V.

The benefit of this measurement method is that the normalized singular values (maximum singular value is set to one) of the channel matrix are changing much more slowly than the channel matrix itself. That implies that an update of the singular values is not necessary very fast with respect to one symbol interval. This gives the possibility to obtain quite accurate estimates. It is one opportunity to get a mid- or even long-term statistic of the channel.

Channel Correlation Matrix

The previously described measures capacity and SINR relates more to the instantaneous channel matrix. This seems to be appropriate when it is possible to update the selected MCS quite frequently. On the other hand, if the layer parameters shall be kept fix over a longer time period, a long-term measure like the correlation matrix of the channel is more appropriate.

The receiver is estimating various channel matrices in a certain time period and calculates the correlation among the matrix elements. The resulting correlation matrix reflects the type of scatterer environment that is present in the interesting time period. Roughly speaking, the correlation matrix shows whether there are strong or weak correlations in the channel matrix. More mathematically spoken, the distribution of the eigenvalues of the correlation matrix give a more precise picture of the correlation situation.

Examples:

All eigenvalues of the correlation matrix are equal

The meaning is that there is a rich scattering environment and e.g. it is valuable to create as many layers as transmit antennas.

Only one eigenvalue of the correlation matrix is significantly greater than zero The meaning is that there is e.g. one dominating path the transmitted signal is emitted along. In such situations, it is possible to more or less fully exploit the transmission potential by creating only one layer.

The benefit of calculating a channel correlation matrix is that the correlation matrix may be measured over a rather long time period. Therefore, noise in the estimate can be suppressed very effectively and, hence, the obtained estimate can be made quite accurate. Less signaling rate for feedback is required since the correlation matrix or the derived MCS recommendations, respectively, are updated rather seldom.

WER, BER

For completeness, the typical measures word error rate (WER) and bit error rate (BER) shall be mentioned here. For MIMO link adaptation, WER and BER are understood as WER and BER per layer.

The (raw or uncoded) BER is obtained by comparing hard decided bits before decoding with the decoded versions. In data transmission, there are usually CRC checks involved at some protocol stage in order to ensure the correctness of a transmitted data packet with a very high probability. These CRC checks may be used to obtain a statistic on the word or frame errors (WER) in the receiver without knowing the actually transmitted data.

The benefits of BER and WER are that the calculation or measurement of WER and BER is rather simple. However, most often the accuracy of the obtained values is insufficient, especially for the WER. The reason is that in order to obtain a high accuracy measurements over a long time period are necessary. Depending on the mobility of the involved environment the channel and hence the transmission conditions have already changed significantly during this long time period. Therefore, the obtained WER or BER does not reflect any longer the current channel conditions.

Rate and Power Assignment Strategies for Layered MIMO

In principle, it has to be distinguished between two basic cases:

a) the assignment shall be adapted to the instantaneous transmission conditions b) the assignment shall be adapted according to long-term characteristics In order to distinguish these two cases, strategies belonging to case a) are named fast adaptive and those belonging to case b) are named slow adaptive.

Fast-Adaptive Assignment Based Upon Layer Capacities

The concept shall be illustrated by the following example:

In this example again four transmit and four receive antennas are used. The available rates of convolutional coding are ½ and ¾. Used modulation schemes are QPSK, 16QAM and 64QAM. Thus, the predefined set of MCS per layer expressed in terms of rate per layer is, $R^{(m)}=\{1, 1.5, 2, 3, 4.5\}$ [bit/symbol].

The applied MIMO scheme is MSSTC. The layer capacities for the current channel conditions are $C^{(0)}=1.53$ [bit/symbol].

$C^{(1)}=2.32$ [bit/symbol].

$C^{(2)}=3.98$ [bit/symbol].

$C^{(3)}=4.23$ [bit/symbol].

The problem is now that the channel being actually available for transmission will already differ by the measured one. That implies also that the calculated layer capacity will look differently. The degree of change in layer capacities depends a) on the time duration between channel measurement and actual transmission, b) on the mobility of the environment, and c) on the used MIMO scheme. The above-mentioned issues have to be considered in form of a margin when assigning the layer rates. The margin itself then also depends on the points a), b), and c) like before.

As an example let us define a capacity margin such that the calculated capacities are reduced by 0.5. The goal now could be defined as to find the MCS the rate of which being the closest to the capacity minus margin (rounding). Alternatively, the MCS with the next lower rate could be selected. For the considered example, the rate assignment with rounding and the exemplary margin of 0.5 results in $R^{(0)}=1.0$ [bit/symbol].

$R^{(1)}=2.0$ [bit/symbol].

$R^{(2)}=3.0$ [bit/symbol].

$R^{(3)}=3.0$ [bit/symbol].

The described example is one way for the rate assignment. The central point is certainly how the margin may be obtained and how it is used. The margin maybe used either as an additive value or as a relative value scaling down the capacities.

Ways to Obtain the Margin:

The important issue is how the channel matrix changes over time and what is the impact on the applied MIMO scheme. In order to assess this, many pairs of two random channel matrices that are correlated in time according to a) the time period lying between channel measurement and actual transmission and b) the assumed mobility of the environment may be generated. For each pair of channel matrices the layer capacities are calculated and either the differences or the ratios between the individual layer capacities are treated as a new random variable. Based upon the PDF or CDF of this random variable and depending on the target error rates the margin can be determined Example:

Fast-adaptive assignment based upon layer SNR: The same strategies as described for capacity may be applied if SINR is taken as LQM per layer.

Slow-Adaptive Assignment Based Upon Correlation Matrix

The idea is that prior to transmission, so-to-say off-line, representative correlation matrices are chosen which reflect typical transmission conditions for the considered antenna configuration. For these representatives, a plurality of random channel matrices according to the considered correlation matrix are generated and the layer capacities $C^{(m)}$ for the MIMO transmission technique which is applied in the considered system, e.g. MSSTC, are calculated for every channel. Depending on the features of the system where MIMO transmission shall be applied, the random channel matrices taken for the described experiment prior to transmission may be either power-controlled or power-normalized to a target SNR value or they are calculated for a target average SNR. Since random channels are involved the capacity of every layer can be regarded as a random variable. One characteristic of such a random variable is its probability density function (PDF) or its cumulative distribution function (CDF).

For the typical cases in MIMO transmission the quasi-stationary condition holds. That means that the channel is quasi-constant during the transmission of one code word, but it has changed considerably between the transmissions of two code words. Given this quasi-stationary condition the value of the layer capacity $C^{(m)}$, where the CDF value is equal to x % corresponds to a word error rate of x % and is therefore referred to as the x %-outage capacity $C^{(m)}_{X\%}$.

The x %-outage capacities per layer $C^{(m)}_{X\%}$ having calculated or to be more specific having measured by off-line simulations or experiments are the basis for a slow-adaptive link adaptation concept. Given the values $C^{m}_{X\%}$ for a target SNR may serve as an indication which are the best suited ratios for the layer rates $R^{(m)}$ that have to be assigned. This concept shall be further specified by the following example.

Example:

Again an antenna configuration with four transmit and four receive antennas is considered. The range of eigenvalue distributions of the correlation matrix spans from only one eigenvalue unequal zero to sixteen identical eigenvalues. As an example 4 representatives of the correlation matrix shall be chosen as follows:

A 16×16 random matrix M is generated; an eigenvalue decomposition of this random matrix is performed to obtain random eigenvectors:

$$M = QLQ^H$$

where Q contains the eigenvectors of M as columns and L is a diagonal matrix containing the eigenvalues. It has to be ensured that the eigenvectors have non-zero entries each, otherwise correlations between some elements might be discarded. In this case, a new 16×16 random matrix is chosen. The four representatives are chosen by defining four different matrices L with 4 different eigenvalue distributions.

$$L_1 = \text{diag}\{1,1,1,1,\ 1,1,1,1,\ 1,1,1,1,\ 1,1,1,1,\}$$

$$L_2 = \frac{4}{3} * \text{diag}\{1,1,1,1,\ 1,1,1,1,\ 1,1,1,1,\ 0,0,0,0\}$$

$$L_3\ 2 * \text{diag}\{1,1,1,1,\ 1,1,1,1,\ 0,0,0,0,\ 0,0,0,0\}$$

$$L_4 = 4 * \text{diag}\{1,1,1,1,\ 0,0,0,0,\ 0,0,0,0,\ 0,0,0,0\}$$

Diag{.} means a diagonal matrix with the elements on the main diagonal given in brackets.

The four representative correlation matrices form a set of pre-calculated matrices and are then obtained by:

$$M_i = QL_iQ^H,\ i=1,2,3,4.$$

A target SNR of 10 dB is chosen. The applied MIMO scheme is MSSTC. The target word error rate shall be 1%. Thus, the 1%-outage capacities per MSSTC layer are the interesting measures. For the representative correlation matrix $M_1$, random channel matrices are generated and the 1%-outage capacities per layer $C^{(m)}_{1\%}$ are calculated. Assume the result for MSSTC may for simplicity look like:

$$C^{(0)}_{1\%} = 2.0\ \text{[bit/symbol]}.$$

$$C^{(1)}_{1\%} = 2.5\ \text{[bit/symbol]}.$$

$$C^{(2)}_{1\%} = 2.8\ \text{[bit/symbol]}.$$

$$C^{(3)}_{1\%} = 3.0\ \text{[bit/symbol]}.$$

Therefore, the rates per layer should be chosen in a similar ratio. To reflect e.g. typical code rates, one strategy could be to define the goal for the normalized layer code rates:

$$[R^{(0)}R^{(1)}R^{(2)}R^3]/R^{(3)} = [\tfrac{2}{3}\ \tfrac{3}{4}\ 1\ 1]$$

This procedure is then repeated for every all other representatives of the correlation matrix $M_2$, $M_3$, $M_4$ as well.

During transmission, the channel correlation matrix is measured (301) and classified (302) as to belong in one of the four classes characterized by the representatives. This may be accomplished e.g. by at least approximately calculating the eigenvalues of the correlation matrix. Given the classified "correlation class", the normalized layer code rates are looked up (303) from the pre-calculated representative correlation matrices. To obtain the actually layer rate the normalized values of the layer code rate are multiplied by reference values (304). Then the layer capacities have to be mapped to the available layer MCS (305). The chosen layer MCS are reported to the layer adaptation means 13 to chose the respective code rate and modulation scheme of each layer. The actually chosen layer rate thus depends a) on the instantaneously measured SNR on the channel and b) on the available set of MCS per layer. One Possible Strategy There is:

The rate of the last (interference-free) layer is chosen firstly according to the MCS appropriate to the current channel conditions (may be obtained by conventional SISO link adaptation since this layer is interference-free). All other rates are selected based upon the given normalized rates.

The actual layer rates may then be chosen according to the MCS with the closest rate (rounding) or according to the MCS with next-lower rate.

It shall be emphasized here that the X %-outage capacity is only one measure the rate assignment could be based upon. Other possible measures are e.g.:

- Average capacity per layer
- Estimated WER out of SINR calculations:
- Similar to calculating layer capacities layer SINRs may be calculated as described above
- These SINR values may be mapped to one WER per MCS in the available set. This mapping is typically be done by simulations for the AWGN channel over SNR. The layer SINR is then identified with the AWGN SNR and the corresponding WER is taken out of the simulation result curve.
- Given a target WER per layer, there is usually one corresponding layer MCS fulfilling this target WER with the highest possible layer rate
- The normalized layer rates may then be defined by ratios of the MCS rates and the procedure continues as described above.

Power Assignments

All solutions described above exclusively treat the assignment of rates to the individual layers. One basic concept for the assignment of different powers to the individual layers could be to assign the powers such that the rate of every layer can be made equal. That means e.g. that the powers are varied until all layer capacities are equal or until all layer SINRs are equal referring to the above-introduced LQMs.

Adapting the Number of Layers to the Long-Term Channel Situation

The slow-adaptive assignment based upon the correlation matrix describes a way to assign rates or MCS per layer based on long-term measurements, namely the correlation matrix. In addition to adapt the layer rates, there is also the possibility to totally switch off or on layers and adapt by this the number of layers appropriately to the observed long-term channel situation. This will be further elaborated in the following.

Regarding the BLAST-type of schemes switching off layers implies switching off antennas and therefore a certain degree of the transmission capacity might be lost, because only parts of the channel are used. This kind of adaptation is already proposed in HSDPA as explained above. The MIMO schemes that are under investigation in particular for this solution are layered schemes where the layer signals are superimposed in a way that all transmit antennas are used at one transmission interval regardless of the number of layers that is used. One representative in the class of these MIMO schemes is MSSTC. The key now is that the generation of the transmitted signal depends on the number of layers that shall be used. That means it is e.g. not sufficient to always generate firstly a transmit signal with maximum number of layers and set the power of some of the layers equal to zero afterwards.

The number of layers in use could be selected e.g. according to

- The number of eigenvalues in the correlation matrix being significantly greater than zero (e.g. normalized Eigenvalue greater than a quarter of the maximum Eigenvalue)
- The number of singular values in the instantaneous channel matrix being significantly greater than zero (e.g. normalized Eigenvalue greater than a quarter of the maximum Eigenvalue)
- Ensure a certain minimum rate per layer, that means if e.g. an MCS of rate 1.0 was necessary to cope with the inter-layer interference and the current SNR and the minimum code rate has been set to 2.0, then this layer would be switched off.

Example MSSTC:

Antenna configuration: 4 transmit antennas, arbitrary number of receive antennas Number of necessary layers was set to 2 because some of the above-mentioned criteria. Then, the MSSTC transmitted signal is generated by a space-time code for 4 antennas while the orthogonal transform, e.g. DFT or Hadamard, has length 2 reflecting the number of used layers.

The benefits are that the more layers are present the more interference between layers is generated in general. If the same data rate can be achieved with less number of layers the receiver becomes simpler and usually the performance improves since there are less losses due to imperfect receiver solutions.

MIMO transmission offers a substantial performance gain when the channel is fed appropriately. The way of link adaptation proposed here tries to exploit a big portion of this potential also in practice.

| TERMINOLOGY AND ABBREVIATIONS | |
|---|---|
| AWGN | Additive White Gaussian Noise |
| BER | Bit error rate |
| CDF | cumulative distribution function |
| CSI | Channel state information |
| DMMT | Discrete matrix multitone |
| HSDPA | High-speed downlink packet access (high-speed mode of UMTS) |
| LA | Link adaptation |
| LQM | Link quality measurement |
| MCS | Modulation and coding scheme |
| MIMO | Multiple-input multiple-output |
| MMSE | Minimum mean square error |
| MSSTC | Multi-stratum space-time coding |
| PDF | probability density function |
| SINR | Signal-to-noise-and-interference ratio |
| SISO | Single-input single-output |
| SNR | Signal-to-noise ratio |
| V-BLAST | Vertical BLAST (BellLabs layered space-time architecture) |
| WER | Word or frame error rate |

The invention claimed is:

1. A method implemented in a receiver having multiple receive antennas for communicating over a radio channel with a transmitter having multiple transmit antennas, comprising:

receiving at the multiple receive antennas a received signal transmitted from the transmitter at which information to be transmitted was divided into multiple subsignals, each subsignal processed separately and transmitted from one of the transmit antennas;

decoding subsignals from the received signal;

subtracting a contribution of each decoded subsignal from the received signal;

calculating a capacity associated with each subsignal;

determining link control information based on the capacity calculated for each subsignal to generate a first set of link control information;

comparing the first set of link control information with multiple sets of pre-calculated link control information;

selecting one of the pre-calculated sets best matching the first set of link control information; and transmitting a feedback signal from the receiver to the transmitter including the selected pre-calculated set of link control information for use by the transmitter in processing future subsignals to be transmitted over the multiple antennas.

2. A method according to claim 1, wherein the calculated capacity is an instantaneous capacity of each subsignal.

3. A method according to claim 1, wherein the calculated capacity is an average of the calculated capacities of each subsignal.

4. A method according to claim 1, wherein the link control information further includes a data rate associated with each subsignal.

5. A method according to claim 1, wherein the link control information further includes a transmit power associated with each subsignal.

6. A method according to claim 1, wherein the link control information further includes an error rate measurement or a signal to noise and interference ratio measurement associated with each subsignal.

7. A method according to claim 1, wherein the selected pre-calculated set of link control information is for use by the transmitter in determining a modulation and/or coding scheme associated with each subsignal.

8. A method according to claim 1, wherein the subsignals are mutually superimposed and diversity is added to each subsignal.

9. A method according to claim 1, wherein a number of subsignals is adapted to current radio channel conditions.

10. A method according to claim 9, wherein the number of subsignals is chosen according to a number of eigenvalues in a correlation matrix.

11. A method according to claim 9, wherein the number of subsignals is chosen according to a number of singular values in an instantaneous channel matrix.

12. A method according to claim 9, wherein the number of subsignals is chosen to achieve a minimum rate per subsignal, and if the minimum rate cannot be achieved, the method further comprises reducing the number of subsignals.

13. A transmitter for a MIMO transmission system, comprising:
    multiple transmit antennas;
    first circuitry configured to divide information to be transmitted into a plurality of subsignals according to a number of used transmit antennas and to process each subsignal separately before transmission by a respective transmit antenna;
    second circuitry for receiving a feedback signal from a receiver, the feedback signal including a pre-calculated set of link control information selected from a group of pre-calculated sets of link control information that best matches a first set of link control information calculated for each subsignal, wherein the link control information includes a capacity associated with each subsignal;
    wherein the first circuitry is configured to process subsignals to be transmitted over the multiple antennas in accordance with the pre-calculated set of link control information.

14. The transmitter in claim 13, wherein the first circuitry is configured to determine a modulation and/or coding scheme for each subsignal based on the pre-calculated set of link control information.

15. A receiver for use in a MIMO communication system, comprising:
    multiple receive antennas for communicating with a transmitter having multiple transmit antennas over a radio channel;
    a receiver for receiving at the multiple receive antennas a received signal transmitted from the transmitter at which information to be transmitted was divided into multiple subsignals and transmitted from the transmit antennas;
    a decoder for decoding subsignals from the received signal;
    a subtracter for subtracting a contribution of each detected and decoded subsignal from the received signal; and
    circuitry configured to:
        calculate a capacity associated with each subsignal;
        determine link control information based on the capacity calculated for each subsignal to generate a first set of link control information;
        compare the first set of link control information with multiple sets of pre-calculated link control information;
        select one of the pre-calculated sets best matching the first set of link control information; and
        transmit a feedback signal from the receiver to the transmitter including the selected pre-calculated set of link control information for use by the transmitter in processing future subsignals to be transmitted over the multiple antennas.

16. A receiver according to claim 15, wherein the circuitry is configured to adapt a number of subsignals to current radio channel conditions.

17. A receiver according to claim 16, wherein the circuitry is configured to the number of subsignals according to a number of eigenvalues in a correlation matrix.

18. A receiver according to claim 16, wherein the circuitry is configured to select the number of subsignals according to a number of singular values in an instantaneous channel matrix.

19. A receiver according to claim 16, wherein the circuitry is configured to select the number of subsignals to achieve a minimum rate per subsignal, and if the minimum rate cannot be achieved, the circuitry is configured to reduce the number of subsignals.

* * * * *